United States Patent Office 3,108,180
Patented Oct. 22, 1963

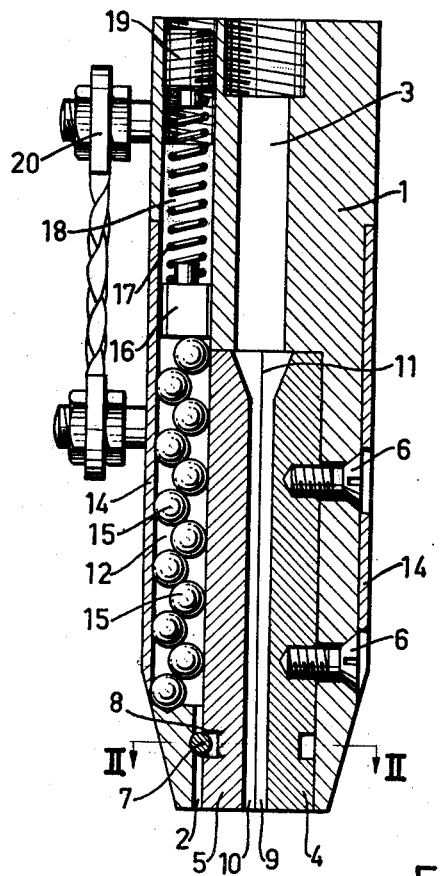
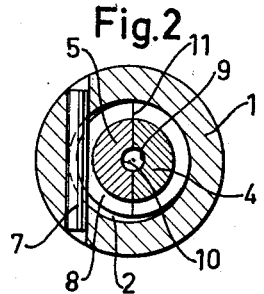
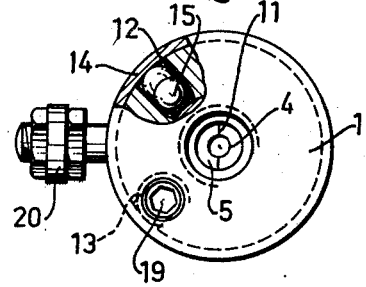

3,108,180
WELDING ELECTRODE MOUTHPIECE
Carl-Eric Linnander, Goteborg, Sweden, assignor to Pullmax Aktiebolag, Goteborg, Sweden, a corporation of Sweden
Filed Dec. 13, 1961, Ser. No. 159,122
Claims priority, application Sweden Feb. 7, 1961
5 Claims. (Cl. 219—130)

In automatized electric arc welding an arrangement is used to a large extent which is generally called welding by a "continuous bare electrode." Here, the welding electrode is constituted by a wire of ordinary circular section and of a comparatively great length. This wire is coiled on a spool and is supplied continuously to the welding point by means of a suitable feeding device, generally taking the form of feeding rollers actuating the wire. To guide the wire toward the welding point, some suitable form of mouthpiece is made use of. To avoid oxidation at the welding point, either a protecting gas such as argon, carbon dioxide and so forth or a slag-forming protecting powder will be supplied to the electric arc. The last mentioned method is called powder arc welding, and the powder supplied is called welding powder.

The simplest form of a mouthpiece or electrode holder is constituted by a rigid round wire guide, in connection with which the electrode is passed through an aperture of a suitably adapted diameter, so that the requisite guidance and electrical contact is obtained between the wire and the mouthpiece. The part of the mouthpiece surrounding and guiding the wire is thus constituted by a circular cylindrical tube member, which is generally made from a copper alloy. Simple as it is, this electrode holder is not quite satisfactory. This is so for the reason that it is difficult to maintain a suitably adapted contact pressure between the electrode and the mouthpiece, involving that the welding current tends to become irregular. The construction can be used to advantage only for rather slender electrodes, where corresponding lower current strengths are produced in the welding operation.

To improve the guidance of the wire and, above all, to attain a better contact pressure between the electrode and the holder, it is known to devise the holder in such manner that the wire passes between two spring-pressed copper jaws.

These jaws are generally of a parallelopipedic shape with a groove of a semi-circular cross section bearing on the wire on opposite sides thereof. The jaws are pressed for instance by a leaf spring on the outside thereof. Hereby a desired improvement of the contact pressure is obtained as well as a certain straightening of the wire, which is generally fed into the holder in a slightly arcuate shape. Although being better than the simple round holder, this latter holder is not entirely devoid of drawbacks. Thus the construction involves that the holder attains a substantially rectangular main cross section by reason of the shape of the jaws and the surrounding support construction. This entails that the holder will have to be adjusted in a certain position depending on the room about the welding point. For example, in considering the case that the welding is carried out in the form of a fillet weld in a corner between two angularly positioned plates, it will be found that the holder must be adjusted with its greatest width in the direction of the corner. This is not always desirable with respect to the guidance of the wire from the supply and the pressing direction influenced thereby against the wire from the jaws. Furthermore, the drawback has to be coped with, particularly in connection with powder arc welding, that the welding powder in the present open construction readily gets in between the wire and the jaw and causes the jaws to be rapidly worn down. This wear is easily distributed unevenly along the jaw, so that the later wears down obliquely. It should be noted that the wear sets in at the guiding groove of the jaw, and when the latter becomes hollowed out too deeply, for instance at one end thereof, the jaws then striking against one another and the contact surface pressure diminishing between the wire and the jaw. The problem involved is thus to bring about a contact surface pressure distributed as evenly as possible.

The present invention aims at avoiding said drawbacks and suggests a solution of said problem.

A welding electrode mouthpiece according to the present invention is principally distinguished by a tubular body having jaws arranged therein for the guidance of a welding wire or the like and for an electric connection of the same, said jaws being movable toward and from one another, members being braced between the tubular body and one or more jaws at contact points evenly distributed along the jaws. Preferably, the braced members are constituted by balls arranged in one or more grooves, channels or the like in the tubular body, said balls being arranged in zigzag-shaped rows.

The present invention will be explained more closely with reference to the accompanying drawing, in which FIG. 1 shows a longitudinal section of a form of embodiment of the invention. FIG. 2 is a section on line II—II in FIG. 1, and FIG. 3 shows the arrangement as viewed from above and partly in section.

The illustrated welding electrode holder is constituted by a tubular body 1, the front cavity 2 of which has a larger inner diameter than the rear cavity 3 thereof. The front cavity 2 has two jaws 4, 5 arranged therein. The one jaw 4 is secured by means of screws 6 to the body 1, whereas the other jaw 5 is movable toward and from the jaw 4. Axially, the jaw 5 is locked against displacement by a pin 7 arranged in the body 1, said pin cooperating with a groove 8 in the jaw. Both of the jaws 4 and 5 are provided with axially extending groove-shaped recesses 9, 10 respectively, which together form the channel through which the welding wire is to be guided. In the manufacture of the jaw one preferably proceeds so that a rod of a copper alloy or the like is turned in a lathe to the requisite diameter, in connection with which a groove 8 is turned into the mantle surface and the rod is provided with a central axially extending bore with a diameter corresponding to that of the welding wire. After that, the rod is sawed along an axially extending plane 11 into two halves, which thus form said jaws, whereupon the one half 4 is provided with attaching apertures for the screws 6.

The body is in a radial direction from the cavity 2 outside the movable jaw 5 provided with two grooves 12, 13 arranged relatively to each other at an angle of 90°, said grooves having parallel side walls, the bottom portions of which have a somewhat smaller width than the other portions of the groove 1 and is open toward the cavity 2. A sleeve 14 is arranged around the body and covers said grooves. The grooves have arranged therein rows of balls 15, which are of a dimension such as to permit of moving freely in the grooves, but cannot fall out of their bottom portions toward the cavity 2. However, they shall permit of penetrating so much out of said bottom portions as to find a support against the mantle surface of the jaw 5. By such an arrangement the jaws may be taken out of the cavity 2 without the mounting and the adjustment of the balls requiring any alteration. The grooves have a height such that the balls may be arranged in zigzag-shaped rows. Acting against the balls is a piston 16 adapted to receive its pressing power by a helical spring 17 braced between the piston and a plug 19 threaded into a bore 18 in the extension of the groove. Electrical connecting members 20 are rigidly connected with the body.

The mounting of the electrode holder shown is effected in the following manner. Upon shrinking on of the sleeve 14 the jaw 4 is secured by means of the screws 6, whereupon the jaw 5 is introduced and fixed axially by means of the pin 7. The balls 15 are introduced through the bore 18, it being attended to that these balls take said zigzag-positions. After that, the piston 16 with the spring 17 is introduced, upon which the plug 19 is tightened up. The electrical connecting members 20 are arranged in their places, whereupon the holder is ready to be secured to the welding wire feeding device (not shown).

On having been secured to the welding wire feeding device the welding wire (not shown) will be fed down through the cavity 3 in between the jaws in the longitudinally extending recesses 9 and 10, the jaw 5 being then displaced radially. Hereby a clearance is produced between the jaws which substantially correspond to the thickness of the cut sawn in the manufacture of the jaws. The wire is displaced further out through the holder to the welding point.

As will be clearly seen from the figure, a very evenly distributed contact pressure of the jaws against the welding wire will be attained by the fact that each other ball presses against the jaw, so that a plurality of evenly distributed attacking points are formed along the jaw. Furthermore, the contact pressure between the jaws and the wire may be easily adjusted by an alteration of screwing-in of the plug 19 and/or by a change of the elasticity of the spring 17. In the construction shown, there are no spring elements in direct contact with the jaw 5 that could be damaged through heat transmission. Said form of embodiment has a circular cross sectional shape of a comparatively small diameter. The holder may therefore be readily adapted in different positions irrespective of the room about the welding point. The holder forms an entirely closed construction, whereby the drawback is avoided that welding powder finds its way in between the wire and the jaws and causes an abnormal wear.

What is claimed is:

1. A welding electrode nozzle comprising a tubular body, bracing jaws provided in said body and forming a guide and electrical contacts for the welding electrode, at least one jaw being laterally adjustable against the other, means for transferring a lateral contact pressure to the adjustable jaw consisting of rows of balls arranged in axially extending grooves provided in the wall of said tubular body, said balls each having diameters less than the transverse diameter of said grooves and the diameters of two adjacent balls being greater than the transverse diameter of said grooves and spring actuated means for axially biasing the balls to produce lateral pressures on the jaw at points of contact between the balls and the jaw and evenly distributed along the length thereof.

2. A welding electrode nozzle comprising a tubular body, bracing jaws provided in said body and forming a guide and electrical contact members for the welding electrode, at least one jaw being laterally adjustable against the other, means for transferring a lateral contact pressure to the adjustable jaw comprising rows of balls arranged in a groove provided in the wall of said tubular body and extending axially thereof, said balls each having diameters less than the lateral distance across each said grooves and greater than half said distance a piston movable in said groove, and spring means for exerting spring pressure axially on said piston, whereby the balls are pressed laterally against the jaw at points evenly distributed along the jaw and said spring means are not affected by the welding heat in said jaws.

3. A welding electrode nozzle according to claim 2, in which a spring is inserted in the groove between the piston and a screw plug adjustable for varying the spring pressure.

4. A welding electrode nozzle comprising a tubular body, two bracing jaws at least one of which is adjustable laterally against the other jaw and forming together a guide and electrical contacts for the welding electrode, a groove in said body opening longitudinally against the adjustable jaw and containing balls each having diameters less than the transverse dimension of each of said grooves with said adjustable jaw opened to its widest extent and each said diameter greater than half each said groove transverse dimension with said adjustable jaw closed to said other jaw, said balls arranged axially in said groove in contact with one another and with the adjustable jaw and axially in said groove resting on a bottom surface of the groove, and a spring actuated piston axially movable in a bore forming an extension of said groove, both said jaws being inserted in a central bore which is open at the end of the tubular body, whereby both said jaws are withdrawable from the bore.

5. A welding electrode nozzle according to claim 4, in which the width of the groove is smaller close to the jaw at the front portion facing the jaw than at the back portion of the groove and smaller than the diameter of the balls, whereby said balls are retained in said groove when said jaws are withdrawn from said bore.

References Cited in the file of this patent

UNITED STATES PATENTS

| 512,826 | Hunt | Jan. 16, 1894 |
| 2,379,470 | Baird | July 3, 1945 |
| 2,872,838 | Vogel | Feb. 10, 1959 |

FOREIGN PATENTS

| 455,775 | Great Britain | Oct. 27, 1936 |